Oct. 8, 1935.     H. F. VICKERS     2,016,878

METHOD OF MAKING VALVE CASINGS

Filed Dec. 30, 1933

INVENTOR.
Harry F. Vickers
BY
Barnes, Kisselle & Laughlin
ATTORNEYS

Patented Oct. 8, 1935

2,016,878

UNITED STATES PATENT OFFICE 2,016,878

METHOD OF MAKING VALVE CASINGS

Harry F. Vickers, Detroit, Mich.

Application December 30, 1933, Serial No. 704,735

5 Claims. (Cl. 29—157.1)

This invention has to do with a valve casing and sleeve, and more particularly with a method of fabricating and assembling same, and the product thereof.

The ordinary fabrication of valves, such as follow-up valve structures requiring precision work, requires much time and expense to obtain the desired result and even then such valve casing must be given considerable attention to keep the same from rusting. It is the object of the present invention to form a valve casing by forming the valve body or housing of common metal such as machine steel and form in place a sleeve of nitralloy in said housing body, the nitralloy sleeve being machined and then nitrided at low temperatures so as not to destroy the finished machining dimensions or surfaces. The result of this assembly is the production of a valve sleeve of unusual hardness, a sleeve with unique wearing qualities, and a sleeve that is non-corrosive.

Figure 1:
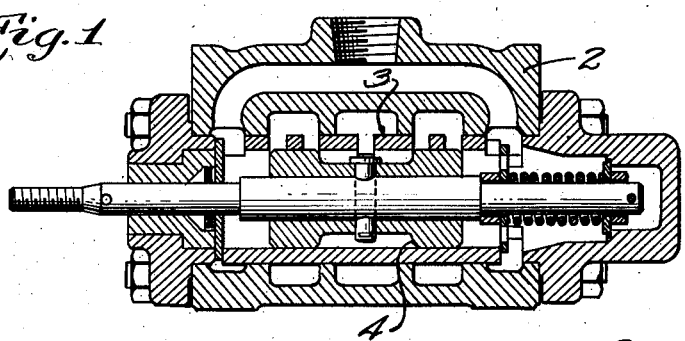
Fig. 1 is a longitudinal sectional view of a standard type of hydraulic follow-up valve with a valve housing and sleeve embodying the present invention.

In the standard type of follow-up hydraulic valve unit shown in Fig. 1, 2 represents the valve housing body, 3 the valve sleeve, and 4 the follow-up valve itself. The various detail features of this unit, including centering springs, etc., need not be gone into; it will be sufficient to say that certain parts of this valve assembly must be very accurate and that when the valve is in the central position shown, oil or other liquid will flow continuously through the ports. There will thus be much wearing action between the ports in the valve sleeve and the valve and, furthermore, there are various points in a valve sleeve of this type which ordinarily must be given considerable grinding and lapping.

Figure 2:
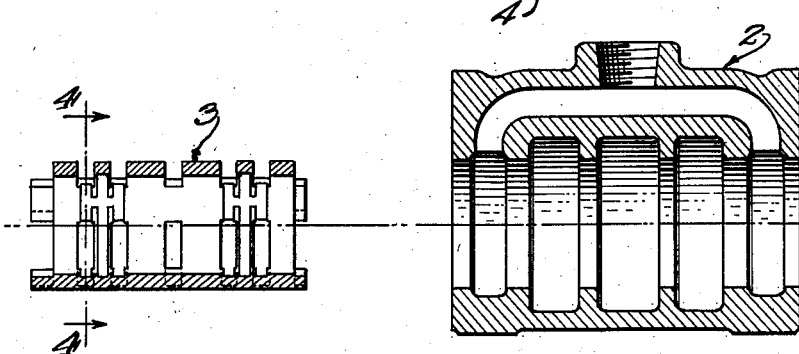
Fig. 2 is a view illustrating the first step in the invention and showing the nitralloy sleeve preparatory to a shrink fit between said sleeve and valve housing.
Figure 3:
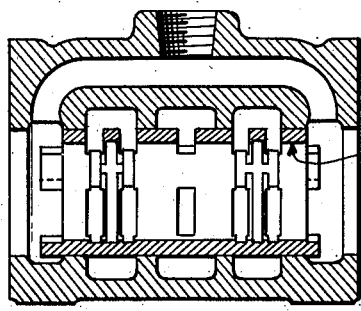
Fig. 3 is a view of the assembled housing unit as it will appear both before and after nitriding.
Figure 4:
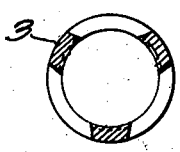
Fig. 4 is a sectional view taken on line 4—4 of Fig. 2.

In carrying out the present invention, the valve housing body as shown in Fig. 2 may be fabricated of ordinary machine steel or may be cast. The valve sleeve is separately fabricated from standard nitralloy steel to the desired configuration and dimensions. Nitralloy steel can not be cast for commercial use. The outer diameter of the sleeve 3 and the inner diameter of the housing body 2 are such that the two may be assembled by what is known as a shrink fit; in other words, the sleeve 3 is cooled and shrunk and the body 2 is heated, the two parts pressed together, and then, of course, allowed to assume a common temperature. What machining is to be done after assembly is then performed and, of course, is a fairly easy and simple operation. Next the completely machined sleeve and, of course, its surrounding housing body are subjected to a hardening process which is known as "nitriding". This process is standard and well known and consists in subjecting the nitralloy valve sleeve to ammonia gas at low temperatures, such temperatures generally ranging around 900° F. The nitriding process is well known to those skilled in the art and usually the parts to be hardened are packed loosely in the container and so positioned as to insure free circulation of the gas. The time of the nitriding period will vary according to the depth of hardness desired.

After the nitriding process is complete, we will then have a valve sleeve of extreme hardness, of great resistance to wear, and a surface which is non-corrosive. The accurate dimensions of the valve sleeve having been obtained by machining before the hardening step, and the nitriding process being at such low temperatures, these finished dimensions will not change or at least not appreciably change, so that the complete valve, with all the advantageous properties of the sleeve is ready for use immediately after the nitriding process.

What I claim is:

1. The process of forming a valve casing for a valve, which comprises forming a valve body of commercial relatively cheap metal, fabricating a valve sleeve of nitralloy and of such dimensions as to be telescoped within the valve body by a shrink fit whereby the sleeve is securely held in position upon the two parts assuming common temperatures, finish machining said sleeve, and then nitriding said assembled valve casing at a relatively low temperature whereby said sleeve is hardened without materially changing the finished dimensions.

2. The process of forming a valve casing for a valve, which comprises forming a valve body of commercial relatively cheap cast metal, fabricating a valve sleeve of nitralloy and of such dimensions as to be telescoped within the valve body by a shrink fit whereby the sleeve is securely held in position upon the two parts assuming common temperatures, finish machining said sleeve, and then nitriding said assembled valve casing at a relatively low temperature whereby said sleeve is hardened without materially changing the finished dimensions.

3. The process of forming a valve casing for a valve, which comprises forming a valve body of commercial relatively cheap metal, positioning a sleeve of nitralloy within and permanently backing said sleeve by said body, finish machining said sleeve, and then subjecting said assembled valve casing to a hardening gaseous atmosphere at a relatively low temperature whereby said sleeve is hardened without materially changing the finished dimensions.

4. The process of forming a valve casing for a valve, which comprises forming a valve body of commercial relatively cheap metal, positioning a sleeve of relatively hard metal, of the type that may be worked and then hardened at relatively low temperatures without material change in shape or dimensions, within and permanently backing said sleeve by said body, finish machining said sleeve, and then nitriding said assembled valve casing at a relatively low temperature whereby said sleeve is hardened without materially changing the finished dimensions.

5. The process of forming a valve casing for a piston type valve, which comprises forming a valve body of commercial relatively cheap metal, fabricating a valve sleeve of nitralloy and of such dimensions as to be telescoped within the valve body by a shrink fit whereby the sleeve is securely held in position upon the two parts assuming common temperatures, finish machining said sleeve and valve casing, and then nitriding said assembled valve casing at a relatively low temperature whereby said sleeve is hardened without materially changing the finished dimensions.

HARRY F. VICKERS.